(12) United States Patent
Breyta et al.

(10) Patent No.: US 7,555,828 B2
(45) Date of Patent: Jul. 7, 2009

(54) METHOD FOR MANUFACTURING A READ SENSOR FOR A MAGNETORESISTIVE HEAD

(75) Inventors: Gregory Breyta, San Jose, CA (US); Mark Whitney Hart, San Jose, CA (US); Bulent Nihat Kurdi, San Jose, CA (US); Dennis Richard McKean, Milpitas, CA (US); Alfred Floyd Renaldo, San Jose, CA (US); Douglas Johnson Werner, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 641 days.

(21) Appl. No.: 10/307,777

(22) Filed: Dec. 2, 2002

(65) Prior Publication Data

US 2004/0103524 A1    Jun. 3, 2004

(51) Int. Cl.
   *G11B 5/127*  (2006.01)
(52) U.S. Cl. .............. 29/603.03; 29/603.07; 29/603.13; 29/603.15; 29/603.18; 216/42
(58) Field of Classification Search .............. 29/603.03, 29/603.15, 603.18, 603.07; 216/22, 42, 40, 216/67; 360/125, 126; 430/5, 296
See application file for complete search history.

(56) References Cited

U.S. PATENT DOCUMENTS

| | | | | |
|---|---|---|---|---|
| 4,978,594 A | | 12/1990 | Bruce et al. ................. 430/14 |
| 5,018,037 A | | 5/1991 | Kroundi et al. ............. 360/113 |
| 5,215,867 A | * | 6/1993 | Stillwagon et al. .......... 430/323 |
| 5,748,412 A | * | 5/1998 | Murdock et al. ............ 360/323 |
| 5,936,813 A | * | 8/1999 | Kim et al. ................... 360/320 |
| 5,985,162 A | | 11/1999 | Han et al. .................... 216/22 |
| 6,007,731 A | * | 12/1999 | Han et al. .................... 216/22 |

(Continued)

FOREIGN PATENT DOCUMENTS

JP    2001043516    2/2001

(Continued)

OTHER PUBLICATIONS

Wayne M. Moreau; Semiconductor Lithography Principles, Practices, and Materials; Plenum Press; Pages from Chapter 12.

(Continued)

*Primary Examiner*—David P Bryant
*Assistant Examiner*—Tai van Nguyen
(74) *Attorney, Agent, or Firm*—Kunzler & McKenzie

(57) ABSTRACT

A read sensor for a magneto resistive head is formed through the use of a bilayer lift-off mask. According to one embodiment, a release layer is formed on top of a sensor layer. A silicon-containing resist layer is formed over the release layer. The resist layer is patterned according to the desired dimensions of the read sensor. Then, plasma etching, such as oxygen plasma etching, is used to remove the portion of the release layer that is exposed by removal of resist material. The release layer may be etched to undercut the patterned resist layer, or may entirely removed beneath the patterned resist layer to provide a bridge of the resist material. In either case, isotropic plasma etching, anisotropic plasma etching, or some combination thereof may be applied.

24 Claims, 9 Drawing Sheets

U.S. PATENT DOCUMENTS

| | | | |
|---|---|---|---|
| 6,103,136 A * | 8/2000 | Han et al. | 216/22 |
| 6,140,023 A | 10/2000 | Levinson et al. | 430/313 |
| 6,218,056 B1 | 4/2001 | Pinarbasi et al. | 430/5 |
| 6,255,022 B1 | 7/2001 | Young et al. | 430/5 |
| 6,493,926 B2 * | 12/2002 | Han et al. | 29/603.14 |
| 6,563,678 B2 * | 5/2003 | Sato | 360/320 |
| 6,861,177 B2 * | 3/2005 | Pinarbasi et al. | 430/5 |
| 2003/0015494 A1 * | 1/2003 | Jayashankar et al. | 216/63 |
| 2003/0182790 A1 * | 10/2003 | Hsiao et al. | 29/603.15 |

FOREIGN PATENT DOCUMENTS

WO    WO 00/36594    6/2000

OTHER PUBLICATIONS

Structure for Lift Off Mask Formation; IBM TDB; Oct. 1975; p. 1396.

Lift Off Mask Structure; IBM TMDB; Oct. 1975; p. 1424.

* cited by examiner (ABS)

METHOD FOR MANUFACTURING A READ SENSOR FOR A MAGNETORESISTIVE HEAD

BACKGROUND OF THE INVENTION

1. The Field of the Invention

The invention relates to wafer materials processing. More particularly, the invention relates to a system and method for making a narrow track-width read sensor for a magnetoresistive head.

2. The Relevant Art

Magnetic head assemblies are typically made of multiple thin film layers which are patterned to form various shaped layers in the head. Some of the layers are plated while other layers are sputter deposited on a wafer substrate. The read head portion of a magnetic head assembly includes multiple layers that are typically sputter deposited. For example, the multiple layers of a read sensor, hard bias and lead layers connected to the sensor and first and second read gap layers below and on top of the sensor are typically sputter deposited. A prior art method of forming shaped sputter deposited layers is to sputter deposit a full film layer of the required material on a wafer substrate, form a patterned resist layer on the layer, ion mill away the exposed portion of the layer and then remove the resist layer leaving the desired shaped layer that was protected therebelow.

The aforementioned method of shaping sputter deposited layers has been generally superseded by a bilayer lift-off mask scheme which is fully explained in commonly assigned U.S. Pat. No. 5,018,037, which is incorporated by reference herein. The bilayer lift-off mask has a T-shape as seen in cross section wherein the vertical portion of the T is short and wide but less wide than the horizontal top portion of the T. The top portion of the T is generally a patterned resist layer and the bottom vertical portion of the T is a release layer. The configuration provides first and second undercuts as seen in cross section wherein each undercut has a height and a length below the resist portion. In the aforementioned patent the bilayer lift-off mask is employed for the purpose of making contiguous junctions of the first and second lead layers with first and second side edges respectively of the read sensor. Multiple read sensor layers are sputter deposited in full film on the wafer substrate followed by formation of the bilayer lift-off mask covering a read sensor site. Ion milling is then employed to remove all of the read sensor material except that below the mask. Full films of hard bias and lead layer materials are then sputter deposited to cover the top of the lift-off mask and an area surrounding the lift-off mask. The heights of the undercuts are generally greater than the thickness of the hard bias and lead layers. This is so a resist stripper can reach the release layer. The stripper is then introduced to dissolve the release layer, causing the bilayer lift-off mask and the hard bias and lead materials deposited thereon to be released from the wafer substrate, resulting in the aforementioned contiguous junctions between the first and second lead layers and the first and second side edges respectively of the read sensor.

The method of the aforementioned patent is currently considered not to be precise enough to implement contiguous junctions between the read sensor and the lead layers. Prior to that patent the lead layers overlapped the top of the read sensor and were constructed with a second resist mask. Since patterning of resist masks is not precise enough to align a second mask with side walls created by a first mask, the overlapping scheme was necessary. Unfortunately, this scheme caused the hard bias and lead layers to form a high profile on top of the read sensor which was replicated through subsequent layers into a write gap of the write head causing a curvature of the write gap. Write gap curvature degrades the performance of the head, since the write head writes curved magnetic bits of information into the rotating disk while the read head reads the magnetic bits of information straight across. This causes a loss of signal at the outside lateral edges of the track width of the read head.

Accordingly, the bilayer lift-off mask scheme has significantly improved the fabrication of read heads by forming contiguous junctions between the lead layers and the read sensor. Fewer processing steps are required and the profile of the lead and hard bias layers above the read sensor has been reduced. Unfortunately, present bilayer lift-off masks are limited to fabrication of read heads with an insufficiently narrow track width. The narrower the track width, the greater the number of tracks per inch (TPI) that can be read by the read head from a rotating magnetic disk. Accordingly, the greater the tracks per inch, the greater the storage capacity of a disk drive employing such a read head. Process control of the undercut has been a significant limitation in the creation of narrower track widths. If the undercut is too deep, the underlying release material will be too narrow and mechanically unstable and can cause the bilayer lift-off mask to be separated from the substrate or to topple over during resist development or subsequent processing steps of ion milling and sputter deposition. If the undercut is too shallow, sputtered material can be deposited on the exposed sides of the release layer. This material can prevent the stripping solvent from completely dissolving the underlayer during lift-off and can allow sputtered material to be left behind. This material left behind can be in the form of protrusions too high to be covered by the thin gap insulator layer, resulting in interlevel shorting paths between the sensor and the overlying shield. These problems can be attributed, at least in part, to the wet resist development step that serves to remove exposed (positive-tone) resist, remove the portion of the release layer underneath the exposed resist, and undercut the portion of the release layer underneath the exposed resist.

At the size scale involved in fabrication of the read head, surface tension forces become significant and potentially destructive. As a fluid dries, surface tension exerts forces on the remaining portions of the resist and release layers. Attempts to produce a narrower read sensor require the production of an even narrower release layer pedestal that results in a structure that may be easily deflected or even toppled in response to surface tension as the developer dries, causing yield and quality control problems. Mechanical agitation, commonly used to in the developing process, also becomes more problematic with narrower pedestals. In addition, variations in surface tension and wetability can lead to variations in undercut lengths in the wet process that exceed allowable tolerances. Accordingly, there is a need for a process of making a bilayer lift-off mask that produces highly controlled undercuts with an appropriately narrow width. Furthermore, there is a need for such a process that is capable of consistently producing bilayer lift-off masks that are not exposed to fluid forces. Yet further, there is a strong-felt need for such a process that is comparatively inexpensive to carry out with commercially available wafer material processing equipment.

BRIEF SUMMARY OF THE INVENTION

The system, method, and apparatus of the present invention have been developed in response to the present state of the art, and in particular, in response to the problems and needs in the art that have not yet been fully solved by current recording head processing technology. Accordingly, the present invention provides improved fabrication processes and intermediate structures that overcome many or all of the above-discussed shortcomings in the art.

According to one exemplary embodiment, a sensor layer is first formed on a substrate or an intermediate layer such as a read gap layer. A release layer is then formed over the sensor layer. The release layer is in one embodiment formed of a material that is susceptible to oxygen-based plasma etching, is insoluble in the fluid used to develop the resist layer, is soluble in the solvent used to remove the resist layer (e.g., N-methyl pyrrolidinone, and has the anti-reflective properties conducive to the desired formation of the resist features.

In one embodiment, the release layer is formed of Durimide, a polyimide available from Arch Chemicals Inc., of North Kingstown, R.I. A resist layer is in subsequent steps applied over the release layer. The resist layer contains materials, designed to allow the resist layer to function as a hard mask layer that remains substantially intact during the plasma etching process. One suitable material is silicon.

After the sensor, release, and resist layers have been formed, the resist layer is exposed in the regions that are to be removed by a resist developer, assuming the resist layer is a positive resist. A developer is then employed for removing the exposed portion of the (positive-tone) resist layer. The remaining portion of the resist layer is thus patterned with a width that corresponds to the desired track width of the read head.

After the resist layer has been patterned, a plasma etching process such as reactive ion etching is performed to transfer the resist pattern into the underlying release layer. According to one embodiment, oxygen gas is used to perform the etching. Plasma etching may be carried out in multiple phases, which may incorporate a mixture of isotropic and anisotropic etching. For example, the portion of the release layer that does not lie underneath the remaining portion of the resist layer may first be anisotropically etched away by directing ions in a direction substantially perpendicular to the wafer. Then, isotropic etching may be applied to form the undercuts in the release layer, underneath the remaining portion of the resist layer. According to alternative embodiments, purely isotropic or purely anisotropic etching may also be used.

According to another alternative embodiment, plasma etching may be used to entirely remove all of the release layer that lies underneath the remaining portion of the resist layer that defines the sensor width. Thus, a gap is formed between the sensor layer and a remaining portion of the resist layer. The portion of the resist layer that defines the sensor width then forms a bridge over the sensor layer.

After the exposed portion of the release layer has been plasma etched away and an undercut or bridge has been formed via the etching process, a portion of the sensor layer lies exposed. The exposed portion of the sensor layer is removed by a method such as ion beam milling. The remainder of the sensor layer is generally protected from the ion beam milling process by the remaining portion of the resist layer. Thus, the width of the remaining portion of the resist layer defines the width of the sensor.

After the sensor layer is patterned, hard bias and lead layers are deposited onto the read gap layer surrounding the remaining portion of the sensor layer, and onto the remaining portion of the resist layer. The remaining portion of the release layer is then dissolved to permit removal of the remaining portion of the resist layer, thereby exposing the remaining portion of the sensor layer. The remaining portion of the release layer is dissolved, for example, by immersion in a solvent such as N-methyl pyrrolidinone.

The result is a reliably formed and well-defined magnetoresistive read sensor sandwiched between contiguous hard bias and lead layers. According to one embodiment, the read sensor is a giant magnetoresistive (GMR) sensor that enables the use of a narrower track width than has previously been possible, so that data may be stored at higher densities.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention is directed to methods of forming a read sensor for a magnetoresistive head of a magnetic disk drive. The read sensor is used in conjunction with a number of other elements, including a magnetic disk and an actuator arm. The head containing the read sensor may be attached to one end of the actuator arm. The magnetic disk may be attached to a rotatable spindle, and the actuator arm may pivot and/or translate to move the read sensor over various portions of the rotating magnetic disk to read magnetically stored data on the magnetic disk.

Figure 1:
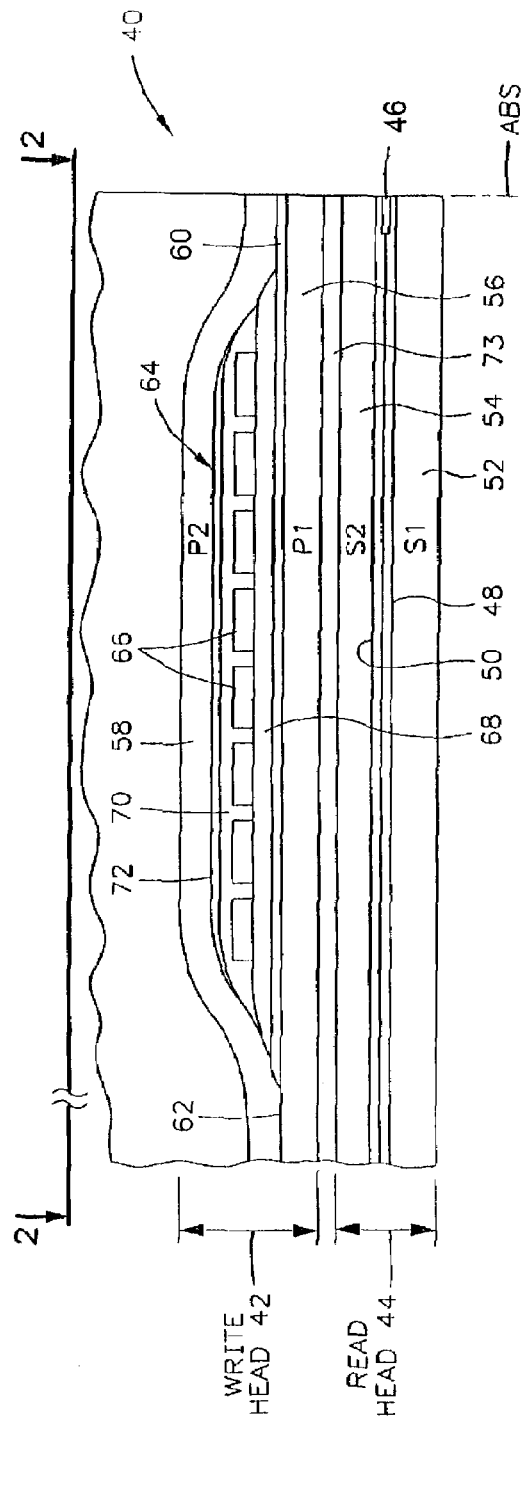
FIG. 1 is a longitudinal cross-sectional view of a portion of a magnetic head assembly including a read head and a write head.

FIG. 1 shows a magnetic head assembly 40 which has a write head portion 42 and a read head portion 44. The read head portion includes a multilayered read sensor 46 which is located between nonmagnetic electrically insulative first and second read gap layers 48 and 50. First and second lead layers, which will be described in more detail hereinafter, are connected to first and second side edges of the read sensor 46. The read sensor 46 and the first and second lead layers are located between nonmagnetic electrically insulative first and second read gap layers 48 and 50. In a merged magnetic head assembly the second shield layer 54 also serves as a first pole piece layer 56 of the write head.

Figure 2:
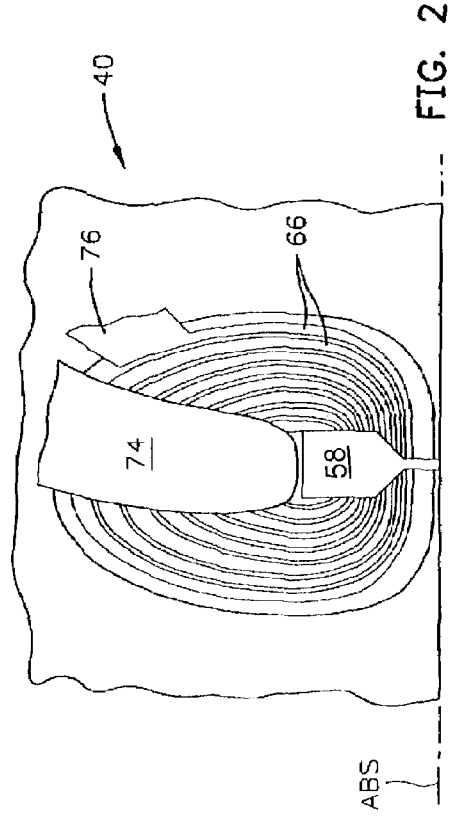
FIG. 2 is a view taken from above plane 2-2 of FIG. 1 with all layers above the first insulation layer of the insulation stack removed except the coil layer, first and second leads for the coil layer and a second pole piece layer.

The write head includes first and second pole piece layers 56 and 58 wherein the second pole piece layer is separated from the first pole piece layer 56 by a nonmagnetic write gap layer 60 in the pole tip region and is connected to the first pole piece layer at a back gap 62 in a back gap region. Between the pole tip and back gap regions is a yoke region where an insulation stack 64 is located between the first and second pole piece layers 56 and 58. Embedded within the insulation stack 64 is a pancake-shaped coil 66 which is located between first and second insulation layers 68 and 70 of the insulation stack and is capped by a third insulation layer 72 to smooth out ripples caused by the coil layer 66. The first pole piece layer 56 is separated from the second shield layer 54 by a nonmagnetic layer 73. Since the first pole piece layer 56 is separated from the second shield layer 54 this type of head is known in the art as a piggyback head. When the first pole piece layer 56 and the second shield layer are a common layer this is known in the art as a merged head. FIG. 2 is a top view of FIG. 1 which is extended to show the back portion of the write coil 66 with first and second leads 74 and 76 that are connected to the coil layer and that provide a write current thereto.

Figure 3:
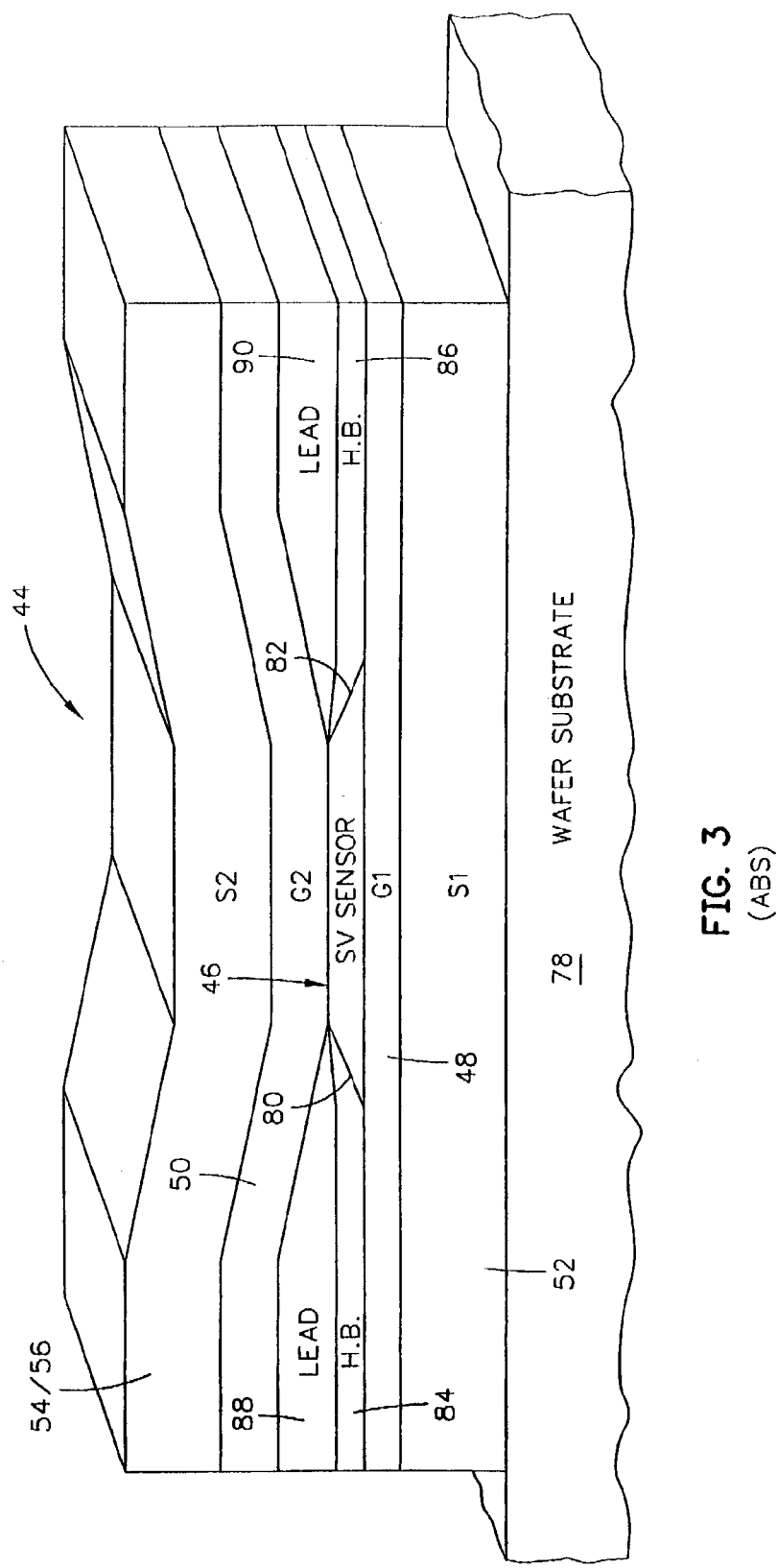
FIG. 3 is an ABS isometric schematic illustration of the read head portion of the magnetic head assembly of FIG. 1.

FIG. 3 is an enlarged isometric ABS illustration of the read head portion 44 of the magnetic head assembly in FIG. 1. It is constructed on a wafer substrate 78. The multilayered sensor 46 has first and second side edges 80 and 82 that are connected to first and second hard bias layers (HB) 84 and 86 and first and second lead layers 88 and 90. This type of connection is known in the art as a contiguous junction which is fully described in the aforementioned U.S. Pat. No. 5,018,037. This type of junction is typically formed by a bilayer lift-off mask with process steps shown in FIGS. 4-7.

Figure 4:
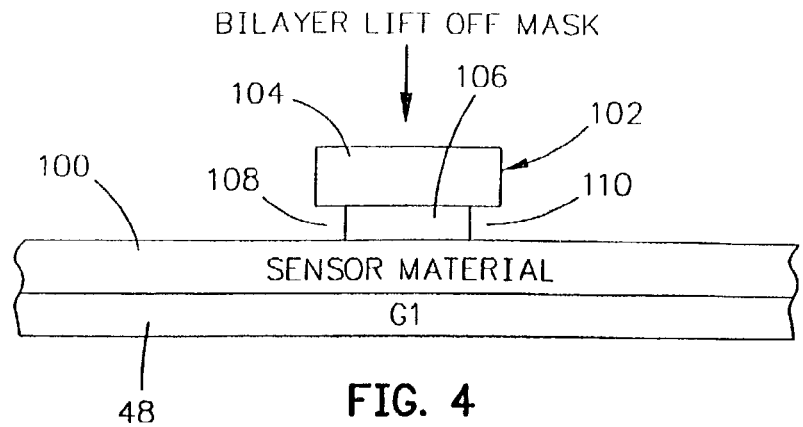
FIG. 4 is an ABS illustration of the first step in forming a bilayer lift-off mask on top of multiple sputtered thin films of sensor material.

FIG. 4 illustrates the first steps in the making of a contiguous junction between the read sensor and first and second hard bias and lead layers. After sputter depositing a sensor layer 100, which may consist of multiple layers of material, on the first gap layer 48, a bilayer lift-off mask 102 is formed on top of the sensor material layer in a region where the read sensor is to be formed. The bilayer lift-off mask 102 includes a resist layer 104 on top of a release layer 106. The release layer 106 has first and second side edges which are recessed below the resist layer to provide first and second undercuts 108 and 110 below the resist layer.

Figure 5:
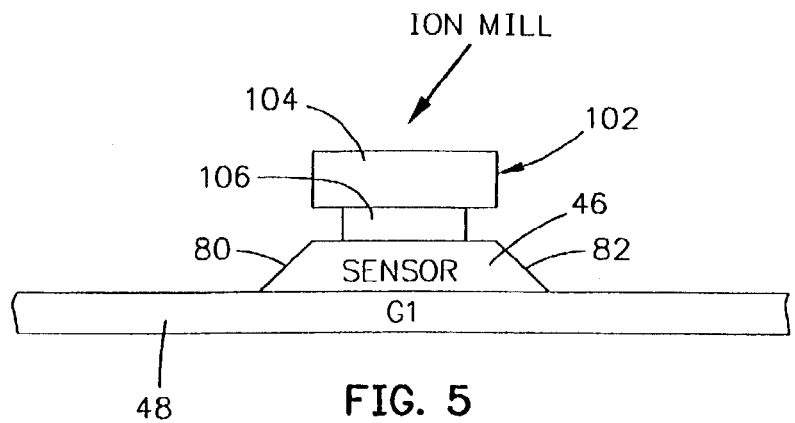
FIG. 5 is the same as FIG. 4 except ion milling has been employed to remove exposed portions of sensor material about the mask.

In FIG. 5, ion milling is employed to remove all of the sensor material layer except for a portion of the sensor material layer below the bilayer lift-off mask 102 so as to form the read sensor 46 with first and second side edges 80 and 82. The first and second side edges 80 and 82 slope outwardly, due to the angle of the ion milling and the shadowing effect of the bilayer lift-off mask 102.

Figure 6:
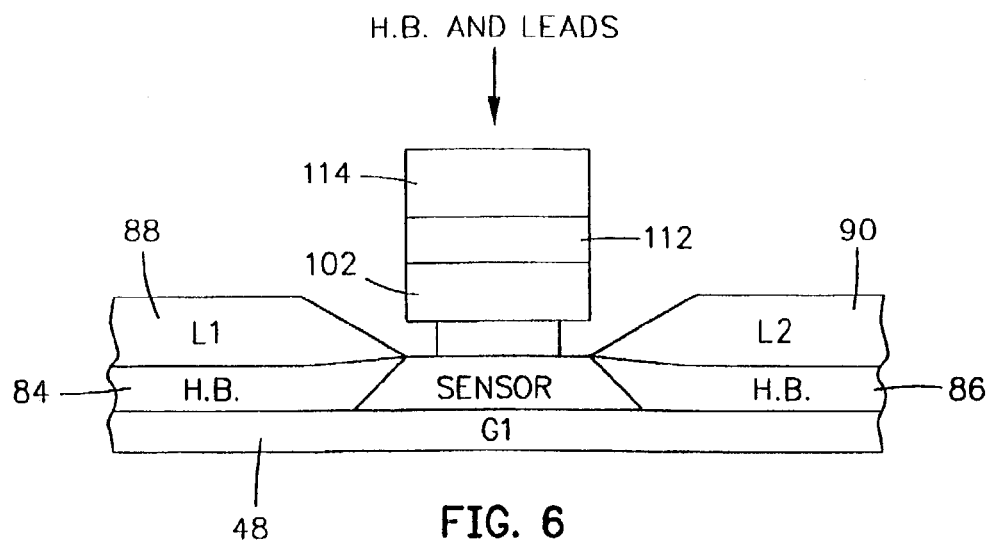
FIG. 6 is the same as FIG. 5 except first and second hard bias and lead layers have been sputter deposited over the entire wafer as well as on top of the mask.

In FIG. 6, a full film of hard bias material 84 and 86 is sputter deposited followed by sputter deposition of a full film of lead material 88 and 90. Because of the full film sputter deposition, a portion of the hard bias material layer 112 and a portion of the lead material layer 114 is formed on top of the bilayer lift-off mask 102.

Figure 7:
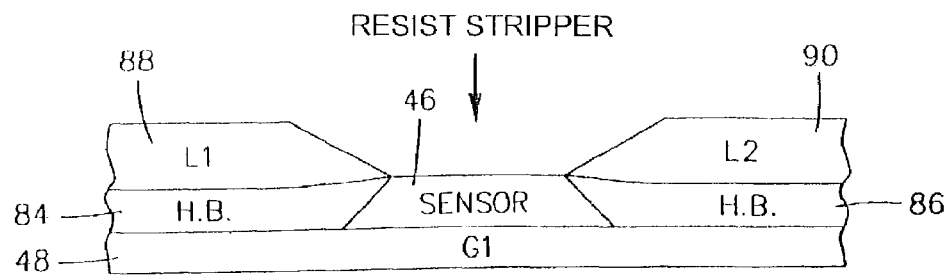
FIG. 7 is the same as FIG. 6 except the mask has been removed with a stripper which also removes the material sputter deposited on top of the mask.

In FIG. 7, the wafer is subjected to a resist stripper which dissolves the release layer 106 and releases the bilayer lift-off mask 102 with the layers 112 and 114 thereon so as to form contiguous junctions between the first and second side edges 80 and 82 of the read sensor and the hard bias layers 84 and 86 and the first and second lead layers 88 and 90. This process is essentially described in the aforementioned patent.

In a prior art process of forming the bilayer lift-off mask 102 in FIG. 4, a resist developer is employed for dissolving exposed resist (if positive tone), for dissolving the release layer underneath the exposed resist, and for dissolving the portions of release layer underneath the unexposed portions of the resist to form an undercut as illustrated in FIG. 4. This is problematic for a number of reasons.

For example, it is difficult to control the contact time of the wet developer with the release layer and therefore difficult to control the degree of undercuts 108 and 110 below the resist layer 104, especially for submicron track widths. This can lead to unacceptable defects and variations of the sensor width from wafer-to-wafer. Too shallow an undercut will allow sputtered material to deposit on the outer walls of the release layer pedestal and this material can prevent stripper from removing the release layer during the final liftoff step. Sputtered material on the release layer can also lead to protrusions too high to be covered by the thin gap insulator layer 50 resulting in interlevel shorting paths between the sensor 46 and the overlying shield 54. Too deep an undercut leads to pedestals too narrow to be mechanically stable.

Furthermore, due to capillary forces inherent in a wet process, the mechanical stability of even properly undercut features can be compromised. As developer dries within the region surrounding the undercuts 108, 110, surface tension forces will pull on the structure and can cause it to deform or topple. This problem grows as the need for narrower track widths, and therefore narrower pedestals, grows. Narrower features are also more vulnerable to structural damage by mechanical agitation of the developer.

Figure 8:
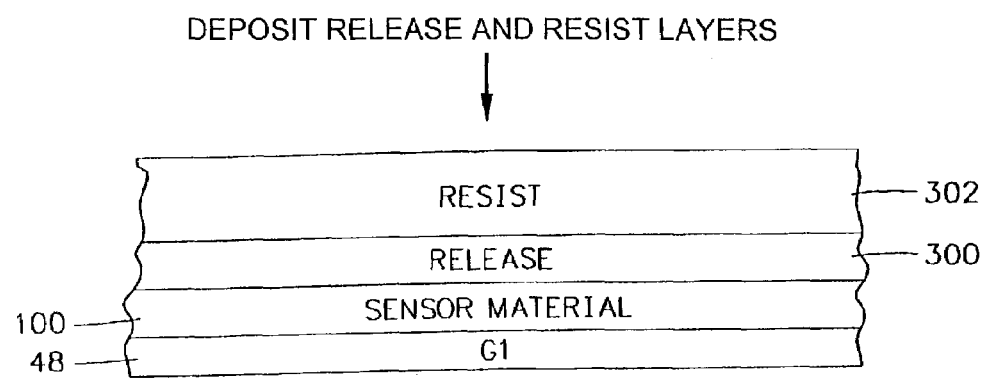
FIG. 8 is a cross-sectional elevation view of a first step in the process of making the present bilayer lift-off mask which comprises the steps of spin coating a release layer and a resist layer, on top of the sensor material.

One embodiment of a process for making a bilayer lift-off mask within the scope of the present invention is illustrated in FIGS. 8-15. As shown in FIG. 8, a full film of multi-thin film sensor layer 100 is first sputter deposited. The sensor layer 100 may include multiple layers designed to cooperate to provide the giant magnetoresistive (GMR) effect so that the head will function as a GMR sensor. A release layer 300 is then formed on the sensor layer 100. The release layer 300, which may be spin-coated or otherwise deposited onto the wafer, is preferably formed of a material that is susceptible to plasma etching, and more particularly, to oxygen-based plasma etching.

The release layer 300 needs to be impervious to the casting solvent of the resist, allow removal and liftoff in available resist strippers and also needs to be impervious to the resist developer. In embodiments wherein the resist is a photoresist, the release layer 300 also functions as an antireflective layer to prevent stray reflection of exposure radiation, although a separate antireflective layer may be applied on the surface of the release layer and under the resist layer. In embodiments wherein the resist layer is an electrom beam resist, the release layer 300 preferably also functions as a conductive layer to prevent charging effects during electron beam exposure and is preferably tailored to discourage backscattering of electrons into the resist. For example, the release layer 300 may be formed of material such as a polyimide, polyethersulfone, polysulfone, polyetherimide, polydimethylglutarimide, poly(styrene-maleimide), poly(vinyl ether-maleimide), poly([meth]acrylate-maleimide), and any combination of the above. The release layer 300 may be a polyimide, such as Durimide, which is available from Arch Chemicals Inc., of North Kingstown, R.I.

A resist layer 302 is then spin-coated on top of the release layer 300 typically followed by a baking step to drive off solvent and possibly anneal the film. The resist layer 302 may contain a number of different components, such as a polymer, a photoactive components such as a radiation-sensitive acid generator, a radiation-sensitive dissolution inhibitor, a radiation-sensitive latent crosslinking site, a photosensitizer, a speed modifier, a surfactant, and a solvent. According to one example, the resist layer 302 incorporates a chemical element capable of self-passivating during plasma etching to protect the resist layer 302 from the plasma etching process. The self-passivating element may, for example, be silicon, which oxidizes in response to oxygen plasma etching to form a protective oxide that keeps the remainder of the resist layer 302 substantially intact during the plasma etching process. In one embodiment, the resist layer 302 contains silicon in an amount between about 5 to about 50% by weight. In another embodiment, the resist layer 302 may contain silicon in an amount between about 10 to about 20% by weight.

The self-passivating element is preferentially incorporated into the polymeric component of the resist layer, as a portion of the classes of polymers which could include a polyyphenolic polymer or polyvinylphenol, a poly(meth)acrylate, a polysilsesquioxane, polynorbornene or copolymers or blends of these types of polymers. Examples of photoresist systems that incorporate the self-passivating element silicon in such ways are described in U.S. Pat. Nos. 6,444,408, 6,340,734, 6,087,064, 5,385,804 5,338,818, and 5,985,524 but are not limited to or by these examples. These patents include the descriptions of materials and processes including various silicon-containing polymer types and blends thereof, positive and negative tone resist systems, the use of various forms of actinic exposure radiation including ultraviolet and deep ultraviolet light along with X-ray and e-beam, along with examples of both so-called "chemically amplified" as well as non-chemically amplified systems.

Figure 9:
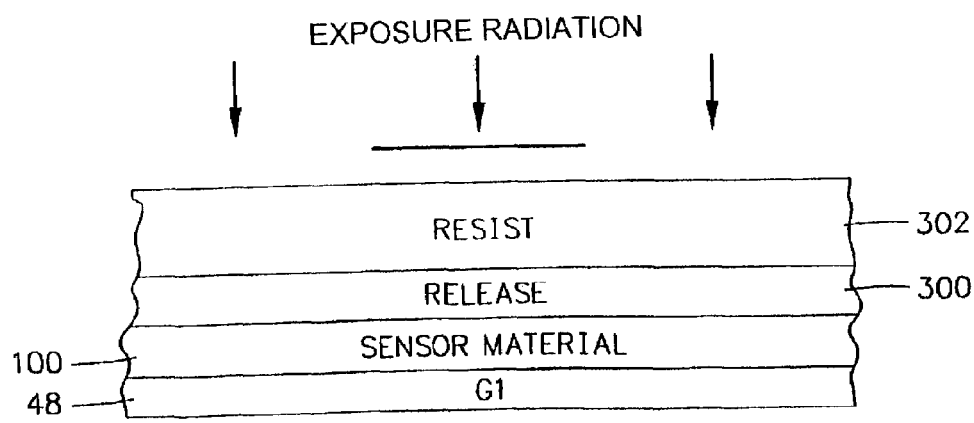
FIG. 9 is the same as FIG. 8 except the resist layer in this drawing, a positive tone resist, has been exposed by actinic radiation in regions that are to be removed by a developer.

In FIG. 9, the resist layer 302 is exposed to actinic radiation in regions that are to be removed, provided the resist is a positive resist. If the resist is a negative resist it is exposed in the regions that are to be retained. Chemically amplified resists are then typically subjected to a second post-exposure bake step. Chemically amplified resists are those wherein each initial radiation-induced event causes multiple catalytic changes in the resist layer 302 during the exposure and any subsequent post exposure bake steps. The actinic radiation may comprise electronic beam radiation, deep ultra-violet (DUV) radiation, X-ray radiation, or other suitable radiation beams and curing mediums.

Figure 10:
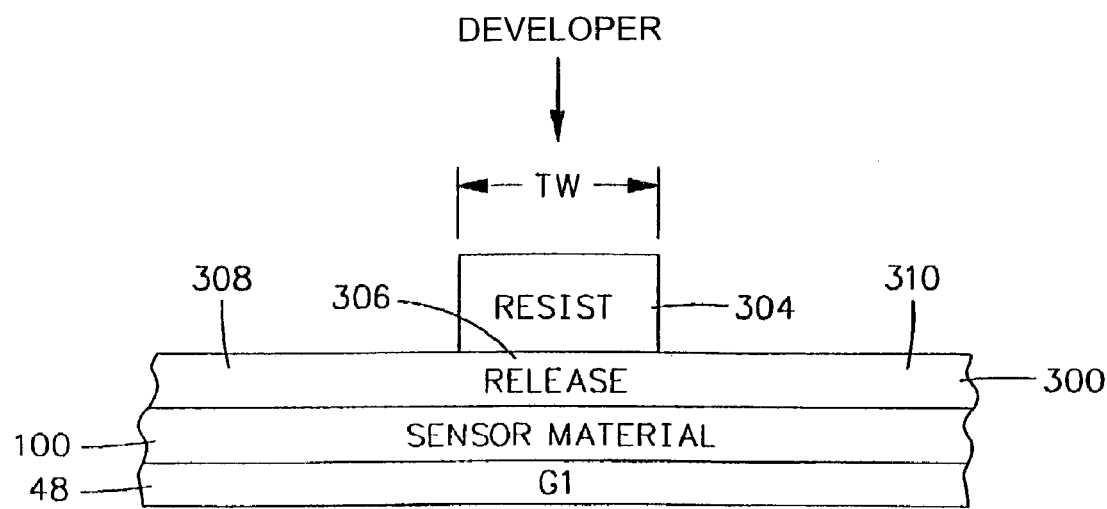
FIG. 10 is the same as FIG. 9 except the exposed portions of the resist layer have been removed by the strong developer.

Next, in FIG. 10, the layers are typically subjected to a developer, which in the case of a photoresist, is typically a strongly alkaline solution such as 0.26N tetramethylammonium hydroxide (TMAH) (eg. Shipley Microposit MFCD-26 or LDD-26W). In a positive tone resist the radiation exposed resist portions are removed during the development step leaving a remaining portion of the resist layer 302, or a patterned resist layer 304, overlying a portion of the release layer 300. The patterned resist layer 304 leaves portions of the release layer 300 beyond the patterned resist layer 304 exposed, as shown in FIG. 10.

Figure 11A:
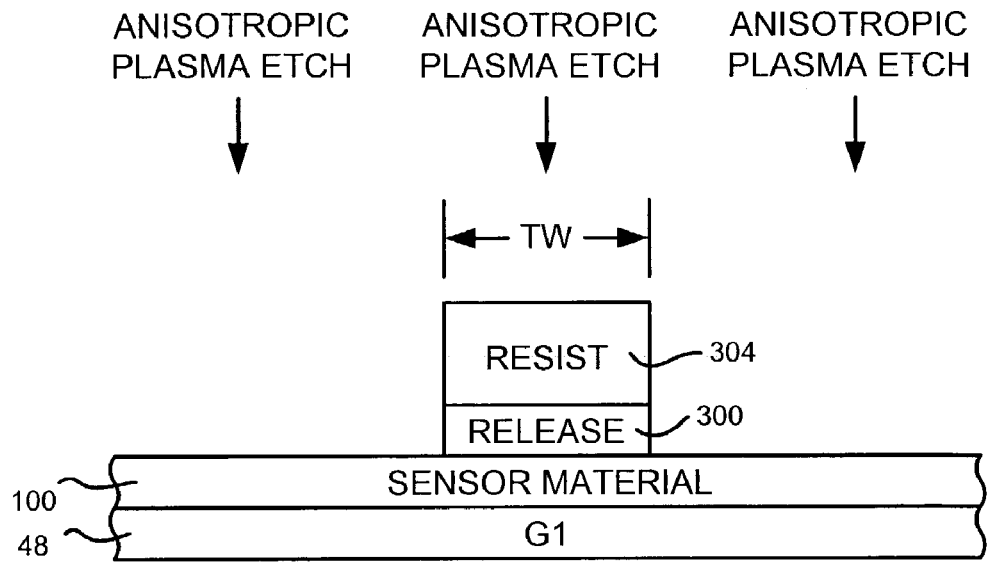
FIG. 11A is the same as FIG. 10 except an initial anisotropic plasma etching step has been performed to remove the uncovered portion of the release layer, without generally undercutting the portion of the release layer that lies underneath the patterned resist layer.
Figure 11B:
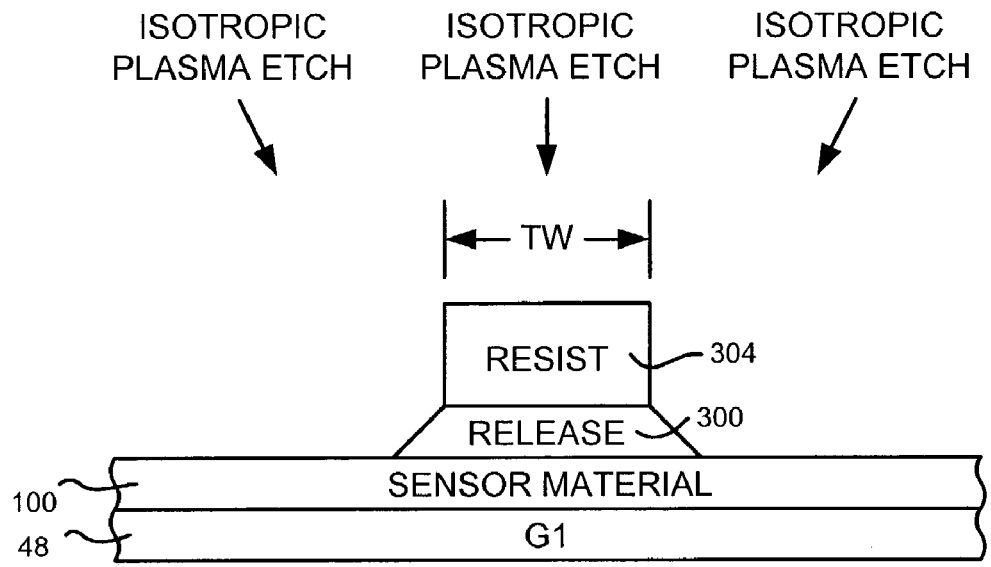
FIG. 11B is the same as FIG. 10 except an initial isotropic plasma etching step has been performed to remove some of the uncovered portion of the release layer, without generally undercutting the portion of the release layer that lies underneath the patterned resist layer.

In FIGS. 11A and 11B, the wafer is placed inside of a plasma etching chamber to plasma etch away the exposed portion of the release layer 300. The plasma etching chamber may be part of an etching tool such as an Inductively Coupled Plasma (ICP) tool. One example of such a tool is the Multiplex ICP, manufactured by Surface Technology Systems (STS). The plasma etching may, in one embodiment, be reactive ion etching (RIE), with oxygen as the active gas.

Plasma etching is carried out by placing the wafer on a platen in a chamber filled with a quantity of the gas. The gas is electromagnetically energized to ionize some of the gas, driving ions and gas particles at high velocity. In isotropic etching, the platen is allowed to electrically float, so that the energized ions and particles are allowed to move in all directions to provide simultaneous multi-directional etching. In anisotropic etching, an electrical bias is applied to the platen to induce the energized ions and particles to move in a direction generally perpendicular to the platen.

FIG. 11A depicts the wafer after the performance of an initial anisotropic etching step. Anisotropic etching etches along a vertical direction (i.e., a direction perpendicular to the wafer). Hence, only the vertically exposed portion of the release layer 300 is removed. The portion of the release layer 300 that lies underneath the patterned resist layer 304 is protected from etching by the patterned resist layer 304. Thus, when the anisotropic etch is properly timed, substantially no undercuts will have been formed.

Exemplary settings for the anisotropic oxygen plasma etching are in one embodiment given by way of example, a flow rate of 30 sccm (+/−5%), a pressure of 6 mTorr (+/−20%), a coil power of 300 W (+/−10%), and a platen temperature of about 20° C. The power applied to the platen in this example is 20 W (+/−10%), and the resulting DC bias is 110 V with silicon wafers. The resulting AC bias is 350 V with silicon wafers. Assuming the release layer 300 is formed of Durimide, the anisotropic etch rate may range from about 30 nm/s to about 35 nm/s. If desired, the etch rate may be further controlled by altering these parameters or by diluting the active gas (i.e., oxygen) within the chamber. For example, nitrogen or some other relatively stable gas may be mixed in with the oxygen to retard the etching process. For a given film thickness, slowing the etch rate increases processing time, but also makes the etching process easier to control.

FIG. 11B depicts the wafer after performance of an initial isotropic etching step, according to an alternative processing method to that depicted in FIG. 11A. Isotropic etching etches away material from the release layer 300 along all directions. The patterned resist layer 304 provides protection from ions or excited particles moving in a substantially vertical direction. However, the patterned resist layer 304 does not protect the release layer 300 from ions and excited particles that move in a substantially horizontal direction. Hence, the portion of the release layer 300 that lies underneath and to either side of the patterned resist layer 304 requires more time to be removed, and therefore is still intact at the intermediate processing stage depicted in FIG. 11B.

Figure 12A:
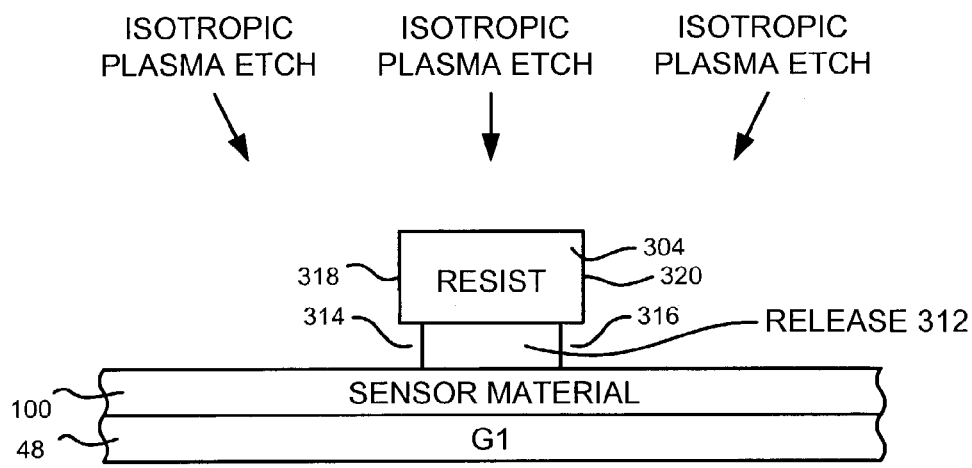
FIG. 12A is the same as FIG. 11A and FIG. 11B except that further isotropic plasma etching has been carried out to form undercuts in the release layer, thereby narrowing the release layer underneath the patterned resist layer.

In FIG. 12A, isotropic plasma etching has been carried out from the configuration of FIG. 11A or the configuration of FIG. 11B. The first and second exposed portions 308 and 310 of the release layer 300 in FIG. 10 have been removed. Additionally, first and second portions of the release layer 300 below the patterned resist layer 304 have also been removed to form a patterned release layer 312 that is recessed from the first and second side edges 318 and 320 of the patterned resist layer 304 to form first and second undercuts 314 and 316. Anisotropic etching may also be used to form first and second undercuts 314 and 316, as etching of the covered edges of the release layer 300 will occur at some rate due to reactive and/or energetic species that get directed toward these edges by secondary processes.

The settings of the undercutting isotropic plasma etch may be the same as those used for the anisotropic etch used to create the structure depicted in FIG. 11A, except that no power is applied to the platen. The platen in this case is allowed to electrically float. Assuming the release layer 300 is formed of Durimide, the isotropic undercut etch rate is from about 0.45 nm/s to about 0.75 nm/s. This rate depends on the release layer thickness and can be altered by changing the plasma conditions. If desired, the undercut etch rate may be further controlled by diluting the active gas (i.e., oxygen) within the chamber. For example, nitrogen or some other relatively stable gas may be mixed in with the oxygen to retard the undercut etching process. For a given film thickness and undercut, slowing the etch rate increases processing time, but also makes the undercut etching process easier to control.

It should be noted that the thickness of the release layer 300 in FIG. 9 is maintained in the patterned release layer 312 in FIG. 12A so as to precisely define the height of the first and second undercuts 314 and 316. The length of the undercuts 314, 316 can be precisely controlled by variation of the amount of time that the final plasma etching step is carried out. As mentioned previously, either anisotropic or isotropic plasma etching may be used exclusively; hence, the undercuts 314, 316 may be formed via anisotropic or isotropic etching. The type of plasma etching may also be used to define the angle of the undercut.

As stated above, the resist layer 300 may contain a self-passivating material such as silicon. Thus, during plasma etching, a silicon oxide may be formed. The oxide acts as a barrier to retard further plasma etching of the patterned resist layer 304 so that the patterned resist layer 304 remains substantially intact during the remainder of the plasma etching process. Hence, the patterned resist layer 304 acts as a shield to define the size and shape of the patterned release layer 312.

Figure 12B:
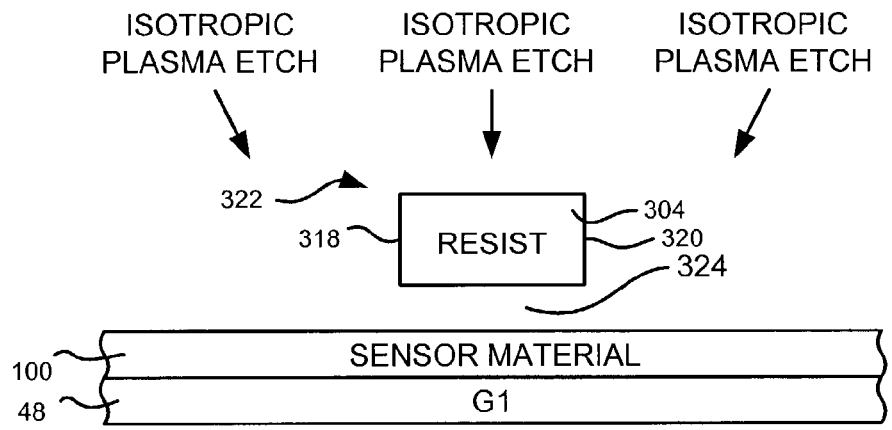
FIG. 12B is the same as FIG. 12A except that further isotropic plasma etching has been carried out to completely remove the release layer from underneath the portion of the resist layer that defines the width of the read sensor, thereby forming a suspended bridge structure of patterned resist over the sensor layer.

In FIG. 12B, additional plasma etching has been carried out according to an optional, extended processing step. As shown, isotropic plasma etching has been used to entirely remove the patterned release layer 312 from underneath the portion of the patterned resist layer 304 that defines the sensor width. Thus, the patterned resist layer 304 forms a bridge 322 over the sensor 46. A gap 324 remains between the bridge 322 and the sensor layer 100. The bridge 322 extends generally perpendicular to FIG. 12B (i.e., out of the page). Isotropic etching may more easily provide lateral material removal. However, anisotropic etching may be used to obtain the same effect, if desired.

The bridge 322 is anchored at both ends by much wider expanses of resist material and release material (not shown). The release material at either end of the bridge 322 is disposed under a greater length of resist material, and thus remains intact despite removal of the patterned release layer 312 from underneath the patterned resist layer 304. Consequently, the patterned resist layer 304 remains in place over the sensor layer 100 during subsequent processing steps, until lift-off.

Such a configuration is beneficial because the undercuts 314, 316 need not be precisely defined. Thus, the plasma etching procedure need not be as tightly controlled as in a process in which the undercuts 314, 316 are to remain. However, care must still be taken to ensure that the plasma etching process does not remove excessive amounts of the patterned resist layer 304, thereby endangering proper patterning of the sensor layer 100 during ion milling. According to certain examples, the bridge 322 may range from about 0.05 to about 0.5 microns in width, and from about one to about four microns in length.

The formation of such a bridge is enabled by the use of plasma etching as opposed to wet development of the release layer 300. The capillary forces present in a wet development process would tend to deform or collapse the bridge 322, thereby damaging the resist mask necessary for making the head.

The use of a bridge 322 is optional; plasma etching may be stopped after formation of the undercuts 314, 316 shown in FIG. 12A. The remaining figures assume that plasma etching has indeed been stopped after formation of the undercuts 314, 316, so that the patterned release layer 312 remains underneath the patterned resist layer 304 during subsequent processing. However, the remaining process steps are substantially the same regardless of whether plasma etching has been continued as shown in FIG. 12B; hence, the following description generally applies to embodiments in which the bridge 322 is utilized as well as to embodiments in which the patterned release layer 312 remains after plasma etching.

Figure 13:
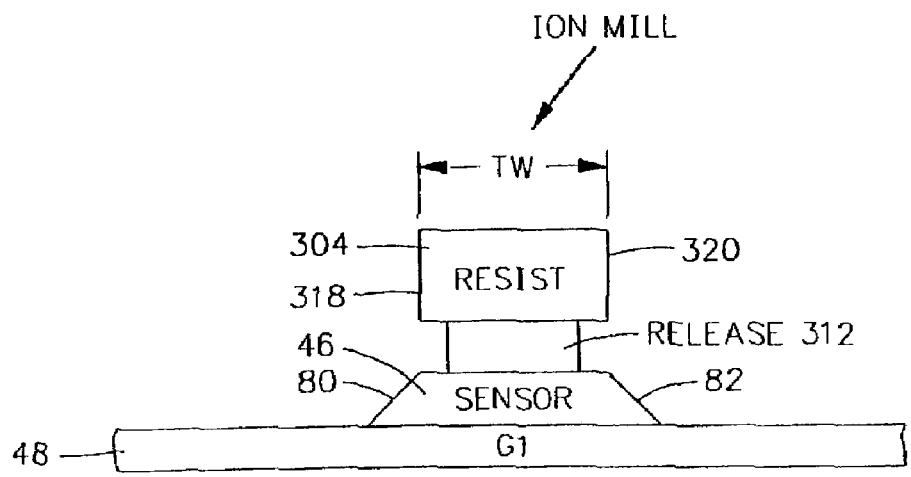
FIG. 13 is the same as FIG. 12A except side edges of the sensor have been formed by ion milling away exposed portions of the sensor material layer.

In FIG. 13, ion milling has been employed to remove all portions of the sensor layer 100 that are exposed by the patterned resist layer 304 and the patterned release layer 312. Hence, only a sensor 46 remains of the sensor layer 100. As shown, the sensor 46 has first and second sloping side edges 80 and 82, in one embodiment the side edges 80, 82 have substantially steep slopes.

The ion milling process may tend to eject metal particles from the sensor layer 100. Such metal particles tend to adhere to the overlying patterned release layer 312 and the patterned resist layer 304. The undercuts 314, 316 withdraw the edges of the patterned release layer 312 from the portions of the sensor layer 100 to be removed, thereby preventing significant buildup of metals on the patterned release layer 312 during ion milling. As a result, the metal does not block access of the solvent to the patterned release layer 312 during the lift-off procedure, which will be described subsequently.

Figure 14:
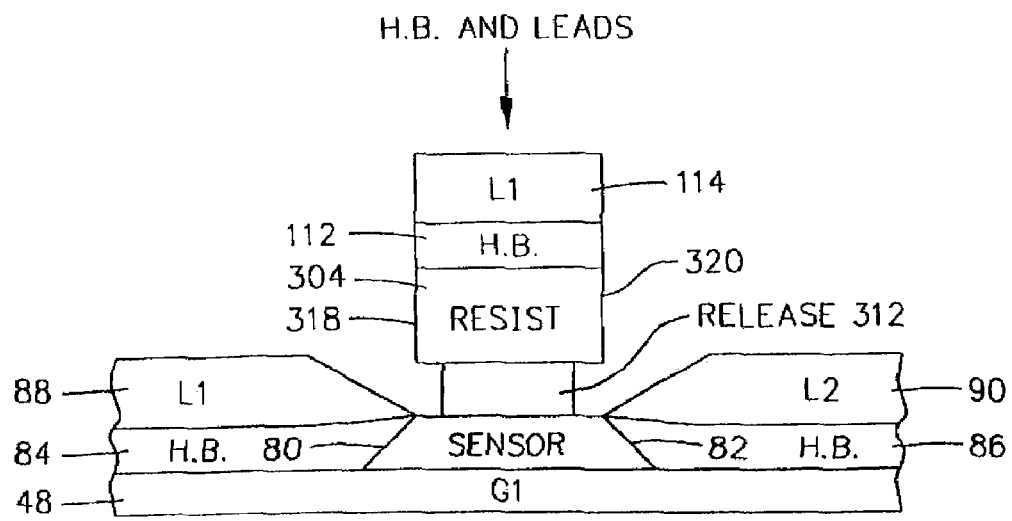
FIG. 14 is the same as FIG. 13 except hard bias and lead layers have been sputter deposited over the entire wafer as well as on top of the resist layer.

In FIG. 14, bard bias and lead layers are deposited to form the first and second hard bias layers 84 and 86 and the first and second lead layers 88 and 90. These layers make contiguous junctions with the first and second side edges 80 and 82 of the sensor 46. This also forms the hard bias layer portion 112 and the lead layer portion 114 on top of the patterned resist layer 304.

Figure 15:
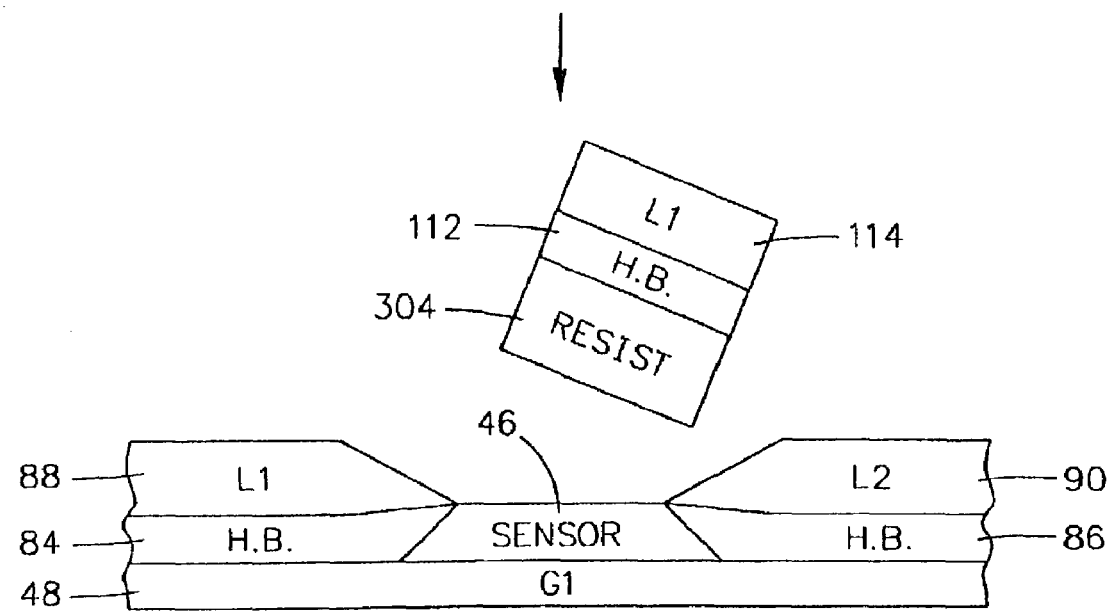
FIG. 15 is the same as FIG. 14 except a stripper has been employed to dissolve the release layer to release the bilayer lift-off mask from the wafer along with the layers sputter deposited thereon.

In FIG. 15, the wafer substrate is subjected to a resist stripper for dissolving the release layer 312 and releasing the patterned resist layer 304 along with the sputtered layers 112 and 114 from the wafer substrate. An exemplary resist stripper for the release layer is N-methyl pyrrolidinone. Alternatively, cyclopentanone, cyclohexanone, dimethylsulfoxide, or other amide-based solvents may be used. It should be noted that such a resist stripper will not attack the lead layers 88 and 90 if they are made of a material such as aluminum copper. The sensor 46, the first and second hard bias layers 84 and 86 and the first and second lead layers 88 and 90 formed in FIG. 15 are the same as the sensor 46, first and second hard bias layers 84, 86, and first and second lead layers 88, 90 in FIG. 3.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A method for manufacturing a read sensor for a magnetoresistive head, the method comprising:
   forming a sensor layer;
   forming a release layer over the sensor layer;
   forming a resist layer over and adjacent to the release layer, the resist layer formed of an actinic radiation definable material;
   patterning the resist layer;
      plasma etching the release layer to remove at least a portion of the release layer that lies generally under the removed portion of the resist layer such that the release and resist layers form a bilayer mask;
   removing a portion of the sensor layer that lies generally underneath the removed portions of the release and resist layers to define the read sensor; and
   dissolving a remaining portion of the release layer to permit removal of the bilayer mask.

2. The method of claim 1, wherein forming the sensor layer comprises forming a plurality of layers configured to cooperate to provide giant magnetoresistive (GMR) sensing.

3. The method of claim 1, wherein forming the release layer comprises applying a material selected from the group consisting of polyimides, polyethersulfones, polysulfones, polyetherimides, polydimethylglutarimides, poly(styrene-maleimides), poly(vinyl ether-maleimides), substituted polystyrenes and polyhydroxystyrenes, poly(meth)acrylates, poly[meth](acrylate-maleimides), and combinations thereof, over the sensor layer.

4. The method of claim 3, wherein forming the release layer comprises applying Durimide over the sensor layer.

5. The method of claim 3, wherein forming the release layer comprises applying Polyarylsulfone over the sensor layer.

6. The method of claim 3, wherein forming the release layer comprises applying Polyetherimide over the sensor layer.

7. The method of claim 1, wherein forming the resist layer comprises applying a hard mask material over and adjacent to the release layer and plasma etching the release layer comprises leaving a remaining portion of the resist layer substantially intact.

8. The method of claim 7, wherein forming the resist layer comprises applying a hard mask material selected to self-passivate during plasma etching to form a barrier to further plasma etching.

9. The method of claim 8, wherein forming the resist layer comprises applying a silicon-containing material as a hard mask material over and adjacent to the release layer.

10. The method of claim 9, wherein the silicon-containing material comprises silicon in an amount between about 5% by weight and about 50% by weight.

11. The method of claim 9, wherein the silicon-containing material comprises silicon in an amount between about 10% by weight and about 20% by weight.

12. The method of claim 1, wherein plasma etching the release layer comprises undercutting a remaining portion of the resist layer such that a remaining portion of the release layer has a width smaller than a width of a remaining portion of the resist layer.

13. The method of claim 1, wherein plasma etching the release layer comprises removing substantially all of the release layer that lies underneath a portion of the resist layer that defines the sensor width to form a gap between the sensor layer and a remaining portion of the resist layer, the remaining portion of the resist layer forming a bridge over the sensor layer.

14. The method of claim 1, wherein plasma etching the release layer comprises oxygen-based plasma etching the release layer.

15. The method of claim 1, wherein plasma etching the release layer comprises anisotropically etching away a first portion of the release layer and isotropically etching away a second portion of the release layer.

16. The method of claim 1, wherein plasma etching the release layer comprises applying only one of the group consisting of anisotropically etching away the portion of the release layer and isotropically etching away the portion of the release layer.

17. The method of claim 1, wherein plasma etching the release layer comprises isotropically etching away a first portion of the release layer and anisotropically etching away a second portion of the release layer.

18. The method of claim 1, further comprising:
   forming a hard bias layer over and alongside a remaining portion of the sensor layer; and
   forming a lead layer over the hard bias layer.

19. The method of claim 1, wherein the remaining portion of the release layer is dissolved using N-methyl pyrrolidinone.

20. A method for manufacturing a magnetic disk drive, the method comprising:
   providing a magnetic disk;
   movably disposing an actuator arm proximate the magnetic disk;
   forming a magnetoresistive head comprising a read sensor, wherein forming the read sensor comprises:
      forming a sensor layer;
      forming a release layer over the sensor layer;
      forming a resist layer over and adjacent to the release layer, the resist layer formed of an actinic radiation curable material;
      patterning the resist layer;
      plasma etching the release layer to remove at least a portion of the release layer that lies generally under the removed portion of the resist layer such that the release and resist layers form a bilayer mask; and removing a portion of the sensor layer that lies generally underneath the removed portions of the release and resist layers to define the read sensor; and attaching the magnetoresistive head to the actuator arm such that the read sensor is positioned to detect magnetically stored data on the magnetic disk.

21. The method of claim 20, wherein forming the resist layer comprises applying a silicon-containing material as a hard mask over and adjacent to the release layer.

22. The method of claim 20, wherein plasma etching the release layer comprises oxygen plasma etching the release layer.

23. The method of claim 20, wherein plasma etching the release layer comprises:

anisotropically etching away a first subset of the portion of the release layer; and isotropically etching away a second subset of the portion of the release layer.

24. The method of claim 20, further comprising dissolving a remaining portion of the release layer to permit removal of the bilayer mask.

* * * * *